Nov. 29, 1932.   J. F. DUBY   1,889,596
VEHICLE CONSTRUCTION
Filed Oct. 7, 1930

Inventor
John F. Duby
by Roberts, Cushman & Woodbury
his Attorneys

Patented Nov. 29, 1932

1,889,596

UNITED STATES PATENT OFFICE

JOHN FABIEN DUBY, OF BOSTON, MASSACHUSETTS

VEHICLE CONSTRUCTION

Application filed October 7, 1930. Serial No. 486,958.

This invention relates to improved suspension and steering stabilizing means for vehicles, being particularly adapted to permit the more steady steering of vehicles by preventing shocks from being transmitted to the steering control members and by reducing or avoiding the tendency toward shimmy or periodic transverse vibrations.

It is desirable to permit limited horizontal movement of the axle longitudinally of a vehicle to somewhat cushion horizontal shocks or thrusts and to reduce or eliminate certain causes of shimmy or transverse vibration of the front portion of the vehicles. In vehicles equipped with low pressure tires and running at high speeds, these periodic transverse vibrations often tend to become especially objectionable. While a plurality of factors may contribute to produce this objectionable vibratory effect which renders steering uncertain and unfavorably affects the riding qualities of the vehicle, it is particularly noticeable that shimmying tends to occur with cars equipped with low pressure tires which are readily deformed upon passing over irregularities in the road surfase. Such deformation causes a material reduction in the effective radius of the deformed tire, while the rotary inertia of the wheel tends to make it maintain a uniform rotary or angular speed. Accordingly, the depressed peripheral portion of the tire which is in engagement with the road surface at the instant of deformation tends to cause that wheel to move more slowly than the remainder of the vehicle, and thus affords an instantaneous or momentary braking effect which pulls the adjoining portion of the axle back in relation to the rest of the vehicle, tending to cause vibratory movement of the axle in a more or less horizontal plane with a resultant objectionable periodic movement of the front portion of the entire chassis. The resultant effect often has a tendency either to cause objectionable movement of the steering wheel, if the control mechanism is not substantially irreversible, or to cause undesirable pivoting of the front wheels about the axes of their supporting knuckles.

In accordance with the present invention, means is provided to permit the limited movement of the front axle in a substantially horizontal direction while providing yielding opposition to such a movement so that a momentary braking effect resulting for example from the compression of one of the front tires, may cause the corresponding portion of the axle to be moved a slight distance horizontally in relation to the chassis frame. With such a yieldable connection the strains which are thrown upon the front portion of the frame are materially less than those which occur with the conventional spring suspension system. Furthermore absorption of shocks in a horizontal direction is permitted so that the riding qualities of the vehicle are improved.

In accordance with the present invention, the steering linkage is so arranged in relation to the axle and the frame that the desirable limited horizontal movement of the former in relation to the latter may occur without interfering with the steering mechanism; in other words, without tending to set up undesirable pivotal movement of the dirigible front wheels about the king pins or without imparting unnecessary and unpleasant shocks to the steering control mechanism and the steering wheel. To permit these desirable results, any suitable connections may be provided between the axle and the frame to permit limited relative horizontal movement therebetween, for example the front of the frame may be supported upon full elliptic springs which are connected to the axle and which are tilted or inclined so that horizontal thrust imparted to the axle causes compression of one or both of these springs. In order to permit this movement to take place without interfering with the steering mechanism, the connecting link between the control member of the steering mechanism and the stub axles or steering knuckles is preferably so arranged that the limited horizontal or fore and aft movement of the axle can occur without substantially affecting the relationship of this link to the parts to which it is connected. Thus, for example, a substantially transverse link may be connected to the steering mechanism and an arm extending from one of the steering knuckles, so that limited fore and aft movement of this knuckle can occur without substantially altering the distance between the parts connected to the ends of the transverse link. In order to aid in attaining this desirable result, a radius rod may be arranged substantially parallel to the control link so that the axle when acted upon by a horizontal thrust will tend to move in an arc which is substantially parallel to the arc defined by the end of the control link that is connected to the steering knuckle. Even if such a radius rod is not employed, however, in the normal position of the parts, the fore and aft movement of the axle will tend to be in the same general direction as that of the arc described by this portion of the control link so that the movement of the axle thus permitted will not appreciably interfere with the steering of the vehicle.

Figure 1:
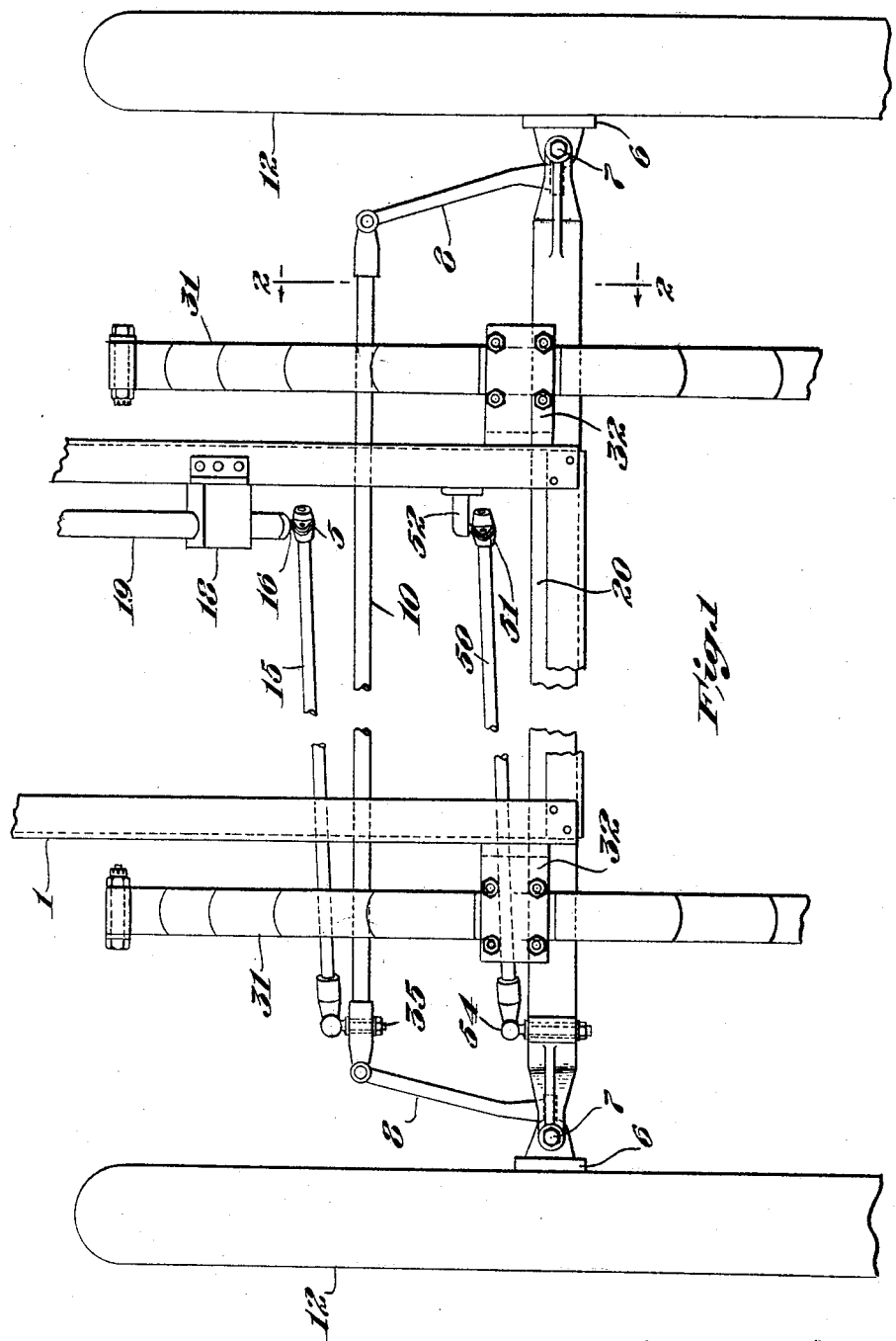
Fig. 1 is a broken plan view of a typical chassis front end with the steering parts, springs, etc., arranged in accordance with the present invention.
Figure 2:
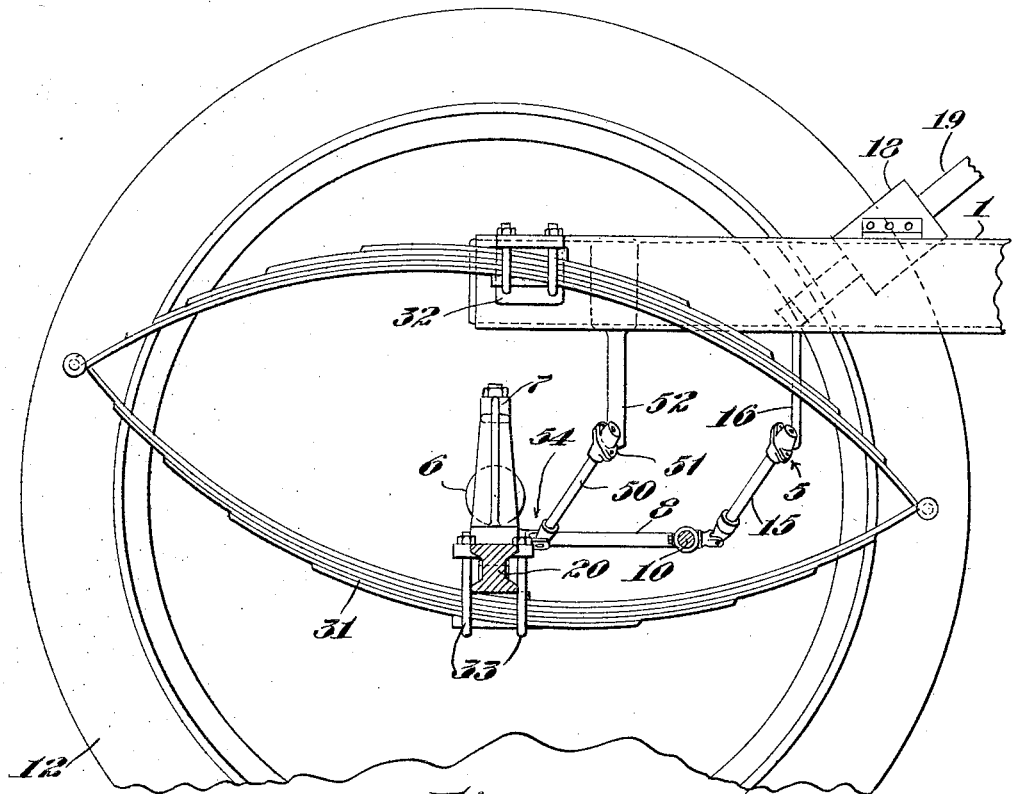
Fig. 2 is a section indicated by line 2—2 of Fig. 1.

Referring to the accompanying drawings, which exemplify one typical embodiment of the invention, it may be seen that the chassis frame is designated in general by the numeral 1. A front axle 20 is disposed beneath the frame 1 and carries stub axles 6 which have the usual king pin and knuckle connections 7 to the end of the axle.

Rearwardly extending arms 8 carried by the knuckles are pivotally connected to a transverse tie rod 10 so that relatively horizontal movement between the tie rod and arms 8 is permitted to effect the movement of dirigible wheels 12 about the king pin connections 7. One end of the tie rod 10 receives a substantially horizontal pin 35 which has a pivotal connection with the drag link 15, thus providing a universal joint at this point, thus a universal connection is in effect provided between the drag link and the knuckle arm 8 which is remote from the steering column. The opposite end of link 15 has a ball and socket connection 5 with the lower end of a depending arm or crank 16 that is controlled by the steering mechanism.

This mechanism may be of any conventional type as shown including the steering box 18 mounted on frame 1 and containing any suitable reduction gearing. The steering shaft 19 which may be rotated by a steering wheel (not shown) extends into the box 18 and is effective in swinging the arm 16. It is evident that such a movement of arm 16 is effective through drag link 15 in causing the movement of the stub axles 6 and wheels 12 about the king pin connections 7. The drag link 15 is connected to the arm 16 and the tie rod 10 by universal joints which readily permit relative movement between the axle and frame except in a direction longitudinally of the drag link.

As shown, the link 15 extends substantially transversely of the vehicle, i. e. parallel to the axle 2. The latter may be connected to the frame by any suitable yieldable means to cushion vertical shock, and also yieldably to permit limited horizontal movement of the axle in relation to the frame. As a typical structural exemplification of such means, I have shown full elliptic springs 31 which are secured by brackets 32 to the frame and clips 33 to the axle in such a manner that the springs have a fore and aft tilt, i. e. the forward joint between the upper and lower halves of each spring is somewhat higher than the rear joint between these parts of the spring. It is evident that when the full elliptic springs are mounted in this manner they not only are effective in cushioning vertical shocks, but also are somewhat yieldable in response to horizontal thrusts imparted to the axle, thus permitting the latter to move backwardly slightly in relation to the chassis frame in response to a backward thrust. Accordingly, when a vehicle of this type passes over an irregularity in the road surface which materially compresses one of the tires so that its effective radius is reduced, the corresponding end of the axle will move backwardly in relation to the chassis frame, the full elliptical spring yieldably opposing this movement and ultimately being effective in returning the axle to its normal position.

Preferably, I provide a radius rod 50 which has a ball and socket connection 51 with a bracket 52 carried by the chassis frame in the region of the connection between the steering control arm 16 and the link 15, and which has a universal connection 54 with the axle in the region of the connection between the link 15 and the drag link arm 8 of the steering knuckle.

Figure 3:
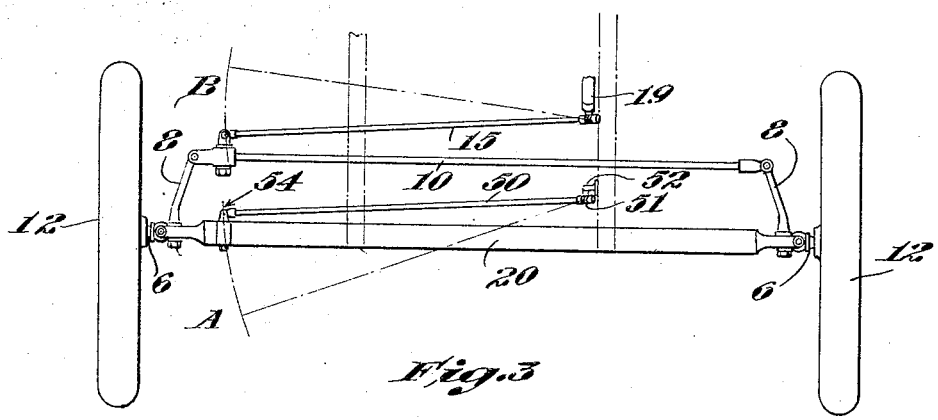
Fig. 3 is a plan view of the chassis front end.

It is thus evident that the end of the axle which carries this connection with the drag link is constrained to move in an arc A (Fig. 3) determined by the radius rod 50 which is substantially parallel with an arc B described by the link 15 swinging about its connection with control arm 16 as a center (Fig. 3). This movement of the axle in a fore and aft direction in relation to the vehicle, as well as vertically or in a direction having both a vertical and a horizontal component, does not materially tend to alter the distance between connections at the ends of link 15, so that this movement does not tend to swing the dirigible wheels about the king pins or to cause objectionable movement of the steering arm 16 and steering control mechanism.

It is evident that this invention affords means readily to permit limited backward and forward movement of the axle of the vehicle in relation to its frame, while providing steering mechanism so arranged that this movement does not cause the drag link to change its position in relation to the end of the steering crank arm and the axle, thus avoiding any movement from adverse effect upon the steering qualities of the vehicle. Thus means are provided permitting the limited absorption of shocks imparted in a horizontal direction and to neutralize the effect of the momentary braking action due to tire deformation, which has heretofore tended to cause shimmying; accordingly the riding and steering qualities of the vehicle are enhanced and stabilized.

I claim:

1. In combination a vehicle frame, an axle, stub axles carrying dirigible wheels and mounted on the axle, yieldable connections between the axle and frame permitting appreciable movement of the axle longitudinally of the frame in response to horizontal thrust upon the axles, steering mechanism including a movable control member mounted on the frame, a link having its respective ends connected to the stub axles and control member, said link being disposed transversely of the vehicle and extending in the same general direction as the axle, and a transverse radius member having opposite ends articulated to the axle and the frame and being arranged to define an arc of axle movement in relation to the frame generally corresponding to the arc described by the end of the link connected to the stub axles swinging about its end connected to the control member, whereby movement of the axle longitudinally of the frame does not cause the link to vary the positions of the stub axles.

2. In combination a vehicle frame, an axle, stub axles carrying dirigible wheels and mounted on the axle, yieldable connections between the axle and frame permitting limited movement of the axle longitudinally of the frame in response to horizontal thrust upon the axle, steering mechanism including a movable control member mounted on the frame, a link connected to the stub axles and control member, said link being disposed transversely of the vehicle and extending in the same general direction as the axle, and a transverse radius member having opposite ends articulated to the axle and the frame, said rod defining a transverse arc about which the axle may move relatively to the frame which is substantially parallel to the arc that the end of the link connected to a stub axle describes in relation to its end which is connected to the control member, whereby movement of the axle longitudinally of the frame does not cause the link to vary the positions of the stub axles.

3. In combination a vehicle frame, an axle, knuckles pivotally mounted at the ends of the axle and carrying stub axles, a transverse tie rod, arms carried by the knuckles and pivoted to the tie rod, a substantially transverse link connected to one of the knuckles to swing the same about their connections with the axle, spring connections between the axle and frame permitting appreciable limited movement of the former longitudinally of the latter, a control member carried by the frame and articulated to the end of the link remote from its connection to a knuckle, whereby the movement of that knuckle longitudinally of the frame is substantially in the direction of the arc defined by the link swinging about its articulated connection to the control member.

Signed by me at Boston, Massachusetts, this 6th day of October 1930.

JOHN FABIEN DUBY.